United States Patent Office 2,906,766
Patented Sept. 29, 1959

2,906,766

PHENYLVINYLTRISILOXANE

Thomas R. Pooley, Midland, Mich., assignor to Dow Corning Corporation, Midland, Mich., a corporation of Michigan No Drawing. Application July 17, 1956
Serial No. 598,263

1 Claim. (Cl. 260—448.2)

This invention relates to the novel composition of matter having the formula

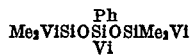

in which Vi represents a vinyl radical and Me and Ph represent methyl and phenyl radicals respectively.

The composition of this invention may be prepared by any of the standard methods for preparing trisiloxanes. Thus it may be prepared by the cohydrolysis of dimethylvinylchlorosilane and phenylvinyldichlorosilane or it may be prepared by the alkaline equilibration of symmetrical tetramethyldivinyldisiloxane and phenylvinylsiloxane cyclics.

The composition of this invention is particularly useful as a diluent for vinylsiloxane resins as is more fully shown in the copending application of Harold A. Clark, Serial No. 598,264, filed simultaneously herewith, the disclosure of which application is included herein by reference.

Specifically the trisiloxane of this invention is an excellent hardener when copolymerized with vinylsiloxane resins.

The following example illustrates the preparation of the composition of this invention.

Example 1

Equimolar amounts of dimethylvinylchlorosilane and phenylvinyldichlorosilane were mixed and added to water. The water was employed in amount sufficient to give a hydrochloric acid concentration of 20% in the aqueous phase. After hydrolysis the acid layer was drained off and toluene was added to the hydrolyzate in amount to give an 80% by weight toluene solution. This solution was washed once with water and then refluxed in the presence of .25% by weight sodium hydroxide (added as a 50% aqueous solution) based on the weight of the solution. The refluxing was continued for 8 hours after all water had been removed. The alkali was neutralized with the addition of phenylvinyldichlorosilane and the solvent was then evaporated.

The product was fractionally distilled to obtain the compound

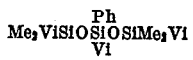

which had the following properties: viscosity 3.01 cs. at 25° C., specific gravity .937 at 25° C., $n_D^{25}$ 1.4693.

That which is claimed is:

A composition of matter having the formula

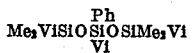

in which Vi is a vinyl radical.

References Cited in the file of this patent

UNITED STATES PATENTS

| | | |
|---|---|---|
| 2,480,822 | Hyde | Sept. 6, 1949 |
| 2,486,162 | Hyde | Oct. 25, 1949 |
| 2,714,099 | Weyenberg | July 26, 1955 |
| 2,756,246 | Burkhard | July 24, 1956 |
| 2,831,010 | Clerk et al. | Apr. 15, 1958 |

OTHER REFERENCES

Scott et al.: "Jr. Am. Chem. Soc." vol. 73 (1951), p. 2599–2600.